US012708932B2

(12) United States Patent
O'Connor

(10) Patent No.: US 12,708,932 B2
(45) Date of Patent: Aug. 18, 2026

(54) ULTRASONIC CLEANING DEVICE FOR ORAL APPLIANCES

(71) Applicant: KP MEDICAL LTD, Monmouth (GB)

(72) Inventor: James Harvey O'Connor, Monmouth (GB)

(73) Assignee: KP MEDICAL LTD, Monmouth (GB)

(*) Notice: Subject to any disclaimer, the term of this patent is extended or adjusted under 35 U.S.C. 154(b) by 0 days.

(21) Appl. No.: 19/084,467

(22) Filed: Mar. 19, 2025

(65) Prior Publication Data

US 2025/0296125 A1 Sep. 25, 2025

(30) Foreign Application Priority Data

Mar. 20, 2024 (GB) ..................................... 2404016

(51) Int. Cl.
*B08B 3/12* (2006.01)
*A61C 7/08* (2006.01)
*A61C 19/00* (2006.01)

(52) U.S. Cl.
CPC .............. *B08B 3/12* (2013.01); *A61C 19/002* (2013.01); *A61C 7/08* (2013.01)

(58) Field of Classification Search
None
See application file for complete search history.

(56) References Cited

U.S. PATENT DOCUMENTS 4,442,852 A * 4/1984 Lord ......................... B08B 3/12 134/135
7,798,159 B2 9/2010 Palfy et al.
(Continued)

FOREIGN PATENT DOCUMENTS

CN 208390557 U 1/2019
CN 209849438 U 12/2019
(Continued)

OTHER PUBLICATIONS

CN208390557 English translation, accessed on Sep. 2025. (Year: 2019).*

(Continued)

*Primary Examiner* — Kaj K Olsen
*Assistant Examiner* — Arlyn I Rivera-Cordero
(74) *Attorney, Agent, or Firm* — Bochner PLLC; Andrew D. Bochner

(57) ABSTRACT

An ultrasonic cleaning device 2 for oral appliances comprises a container 4 and a base 6 on which container 4 is detachably mounted; wherein container 4 comprises a tank 16; wherein the device further comprises an ultrasonic transducer to convey ultrasonic waves to a liquid in tank 16; wherein base 6 of the device is a power supply base comprising electrical connection means; wherein container 4 is provided with corresponding electrical connection means configured for cooperation with the electrical connection means of the power supply base when container 4 is mounted on base 6; wherein the electrical connection means of base 6 and the electrical connection means of container 4 are each provided by an inner contact member and an outer contact member; and wherein at least one barrier ridge 30 surrounds the inner and outer contact members when container 4 is mounted on base 6, the or each barrier ridge 30 being configured to hinder ingress of liquid towards the inner and outer contact members in use of the device.

15 Claims, 11 Drawing Sheets

(56) References Cited

U.S. PATENT DOCUMENTS

| | | | | |
|---|---|---|---|---|
| 7,892,485 | B1 * | 2/2011 | Flannery | A47L 13/59 15/261 |
| 2021/0286199 | A1 * | 9/2021 | Sun | G02C 13/008 |
| 2025/0242390 | A1 | 7/2025 | Brayshaw | |

FOREIGN PATENT DOCUMENTS

| | | | |
|---|---|---|---|
| CN | 211191219 | U | 8/2020 |
| CN | 215226572 | U | 12/2021 |
| DE | 202005020283 | U1 | 3/2006 |

OTHER PUBLICATIONS

Combined Search and Examination Report of the United Kingdom Patent Office in related UK Patent Appl. No. GB2404016.4, dated Sep. 2, 2024; 8 pages.

Extended European Search Report of the European Patent Office in related European Patent Appl. No. 25164878.8 dated Jul. 29, 2025, 10 pages.

* cited by examiner 10
12
2
4
6
8

10
12

14
10
12

4
12
10

C
4
16

2
12
10
14
16
4
36
18
20
30
32
6

26
24
4
38
28
64
34

20
6
18
36
30
32

2
10
12
14
16
22
40
42
48
50
52
54
56
58
60

ULTRASONIC CLEANING DEVICE FOR ORAL APPLIANCES

TECHNICAL FIELD

The present invention relates to an ultrasonic cleaning device for oral appliances.

BACKGROUND

Over time, poorly maintained oral appliances can accumulate bacteria and plaque, which contribute to a range of oral health issues, including bad breath and cavities. Ultrasonic cleaning technology has been used in clinical dental settings for many decades due to its safety and reliability. In recent years, ultrasound cleaning technology has been adapted for personal use.

Oral appliances suitable for ultrasonic cleaning include clear aligners, retainers (including those with metal), mouth guards, dentures, bite guards (night guards), sleep apnoea devices, toothbrush heads and snore guards.

Ultrasonic cleaning is useful for eliminating bacteria, viruses and pathogens, keeping oral appliances looking clean, removing harmful plaque build-up and saving a user time and effort.

During ultrasonic cleaning, an oral appliance is placed in a solution and subjected to high-frequency ultrasonic waves which vibrate the solution and produce millions of nano-scale bubbles. These bubbles rapidly expand and collapse, releasing a large amount of energy and continuously removing grime, bacteria and plaque while being non-abrasive to the oral appliance. This cavitation action can provide effective cleaning in a few minutes of exposure of the oral appliance to ultrasonic waves. The lack of abrasion using ultrasonic cleaning is beneficial as there is a much-reduced risk of causing micro-abrasions which might harbour bacteria and compromise the appearance of the oral appliance. Sterilising tablets may be used in the solution, particularly to achieve an anti-viral effect.

Cosmetic dental appliances, such as clear plastic aligners, are increasingly popular. Such aligners may be worn for up to 22 hours a day and so there is a need for effective and quick cleaning to maintain the discreet aesthetic look and to preserve oral health.

CN211160989 U discloses an example of an ultrasonic cleaning device for personal use: a low-noise ultrasonic cleaning machine comprises a silencing cover and a machine body; the silencing cover is arranged at the top end of the machine body to reduce noise levels generated when the cleaning machine is used.

DISCLOSURE OF INVENTION

The present invention seeks to provide an improved ultrasonic cleaning device for oral appliances.

According to the present invention in a first aspect there is provided an ultrasonic cleaning device for oral appliances, the device comprising a container and a base on which the container is detachably mounted; wherein the container comprises a tank; wherein the device further comprises an ultrasonic transducer to convey ultrasonic waves to a liquid in the tank; wherein the base of the device is a power supply base comprising electrical connection means; wherein the container is provided with corresponding electrical connection means configured for cooperation with the electrical connection means of the power supply base when the container is mounted on the base; wherein the electrical connection means of the base and the electrical connection means of the container are each provided by an inner contact member and an outer contact member; and wherein at least one barrier ridge surrounds the inner and outer contact members when the container is mounted on the base, the or each barrier ridge being configured to hinder ingress of liquid towards the inner and outer contact members in use of the device.

The present invention provides an ultrasonic cleaning device with a separate container and base, meaning that the container can be detached from the base for ease of cleaning and filling with liquid; the container can be removed from the base and taken to a sink to be rinsed out and filled with water from a tap, for example.

Preferably, at least one barrier ridge is provided on a mounting surface of the container and/or the base.

The barrier ridge acts as a barrier to water ingress. The barrier ridge is a narrow elevation across a surface. It may be an annular ridge. It may be provided on a mounting surface of the container or the base. The barrier ridge is a physical feature and is not an electrical connection means.

In one embodiment, a single barrier ridge is provided. In other embodiments, more than one barrier ridge is provided. For example, one barrier ridge may be provided on a mounting surface of the container and another barrier ridge may be provided on an opposing mounting surface of the base.

A recess or groove may be provided on a mounting surface opposing the or each barrier ridge to accommodate the barrier ridge when the container is mounted on the base.

The barrier ridge prevents wicking of liquid by capillary action towards the contact members and thus prevents corrosion of the contact members in use of the ultrasonic cleaning device.

The barrier ridge also acts to hinder relative sliding motion between the opposing mounting surfaces of the container and base and therefore prevents damage to the contact members when the container is mounted and detached from the base.

The outer contact members may be radially-spaced from the inner contact members.

The respective inner contact members may be centrally positioned. In one embodiment, the respective inner contact members are centrally positioned at an axis of rotation of the ultrasonic cleaning device.

A first inner contact member may be a projection adapted to contact a second inner contact member in use to make an electrical connection.

A first outer contact member may be a projection adapted to contact a second outer contact member in use to make an electrical connection.

The first inner contact member and the first outer contact member may both extend from a mounting surface of either the base or the container, the barrier ridge being configured to protect the first inner contact member and the first outer contact member from damage when the container is mounted and detached from the base.

The second inner contact member and the second outer contact member may be provided on an opposing mounting surface of either the base or the container, as appropriate.

The first inner contact member may be a projection such as a connector pin. In one example, this projection is provided on the base. The first outer contact member may be a projection such as a connector pin. In one example, this projection is also provided on the base. Other embodiments are envisaged where the projections such as connector pins are instead provided on the container, or one projection is provided on the base and another projection is provided on the container, for example.

The second inner contact member may be a substantially-planar contact surface. In one example, this planar contact surface is provided on the container. The second outer contact member may be a substantially-planar contact surface. In one example, this planar contact surface is provided on the container. Other embodiments are envisaged where these contact surfaces are instead provided on the base, or one contact surface is provided on the base and another contact surface is provided on the container, for example.

In one embodiment, the second outer contact member is annular and is concentric with the second inner contact member. The second inner contact member may be circular.

The electrical connection means of the power supply base may be battery-powered.

Alternatively, the electrical connection means of the power supply base may be configured to be connected to an external electrical source.

A reliable electrical connection between the container and the base is effected, at least in part, by the weight of the container, particularly when it is filled with liquid. Magnetic connection means may be provided to supplement the connection between the container and the base. The container and the base may be therefore also be connected via a magnetic material.

A power supply is electrically connected to the ultrasonic transducer via the inner and outer contact members. Ultrasonic transducers are well known for providing ultrasonic waves.

The tank may have a base portion and one or more side portions upstanding from the base portion to define an internal cleaning chamber for receiving one or more oral appliances.

The ultrasonic transducer may be located externally of the cleaning chamber and adjacent the base portion of the tank.

The tank is preferably cylindrical in shape.

The container may be substantially dome-shaped with a substantially circular perimeter in plan view to accommodate the tank.

The container preferably comprises a removable lid for sealing the tank.

The container may comprise a housing for the tank and the ultrasonic transducer may be located in the housing externally of the tank. The housing may provide sound insulation.

The lid may be removably attachable to the housing. The lid is preferably attached with a fit which is not too tight, for ease of use.

The lid may be fully detachable from the container. In one embodiment, the lid is attached with a push-fit. In another embodiment, the lid is attached with a screw-fit.

Alternatively, the lid, when removed, may remain attached to the container; for example, the lid may remain connected to the container by a hinge.

The base may be substantially circular in plan view.

The base may be weighted for stability. The base may be provided with feet for stability: the feet may be of a relatively high-friction material to hinder travel of the ultrasonic cleaning device along a surface during use.

The ultrasonic cleaning device is preferably provided with a centring arrangement to assist the mounting of the container on the base.

The container may be detachably mounted on the base via at least a central connection.

When the container is mounted on the base, opposing mounting surfaces of the container and the base may be shaped to substantially inter-fit; one of the mounting surfaces may be provided with at least one projecting portion and the opposing mounting surface may be provided with at least one cooperating recessed portion. The opposing mounting faces may be otherwise generally planar. The opposing mounting surfaces may be hydrophobic.

The projecting portion(s) and the recessed portion(s) may provide, inter alia, the central connection between the container and the base and preferably allow the ultrasonic cleaning device to self-centre. The central connection may be axially-located.

The ultrasonic cleaning device of the present invention preferably includes means for aligning the container on the base.

The base may be provided with means for alignment of the container on the base and/or the container may be provided with means for alignment of the container on the base. The means for alignment preferably includes the barrier ridge.

The base and the container may each be provided with the means for alignment and a first means for alignment comprises at least one protrusion and a second means for alignment comprises at least one recess configured to receive the at least one protrusion. The first means for alignment may comprise at least two protrusions: one of these protrusions may be circular or annular and another protrusion may be annular. The second means for alignment may comprise at least two recesses; one of these recesses may be circular or annular and another recess may be annular.

In one embodiment, at least two protrusions (for example, two or three protrusions) are provided on the base as a means for alignment, one of these protrusions being the barrier ridge, with corresponding recesses to receive the protrusions being provided on the container.

The ultrasonic cleaning device of the present invention preferably includes means for aligning the container on the base at any angle of orientation relative to the base.

In one embodiment, the container is mounted on the base in any radial orientation of the container relative to a central axis of the base.

The container is portable: it is detachable from the base to be taken to a tap to be filled with water, leaving the base in situ. The container is relatively light and easy to fill but is stable in operation due to the weight of the liquid in the tank and the means for securely mounting it on the base.

The ultrasonic cleaning device is sealed to prevent ingress of water into the base and into the housing of the container: spaces between relevant components are preferably designed to be narrow and adhesive may be used to seal these spaces. The ultrasonic cleaning device is therefore suitable and safe for use in damp environments such as bathrooms.

The ultrasonic cleaning device may comprise acoustic dampening materials. These may be the materials used for the housing and the lid. Also, sealing rings may be present inside the ultrasonic cleaning device to assist with acoustic dampening.

The ultrasonic cleaning device may comprise a control circuit for driving the ultrasonic transducer.

The control circuit may be arranged to provide a pulsed ultrasonic power mode to turn the power to the ultrasonic transducer on and off at intervals (which may be regular or irregular). Such pulsing may be provided at a micro level (i.e. in milliseconds rather than minutes).

The effect of using a pulsed ultrasonic power mode may permit an instant 'shock' cleaning effect as soon as the device is switched on; this appears to be beneficial for overall cleaning efficacy of an oral appliance.

According to the present invention in a second aspect, an ultrasonic cleaning device for oral appliances comprises a tank for holding a liquid and at least one oral appliance, an ultrasonic transducer arranged to convey ultrasound waves to the tank, and a removable lid for sealing an opening of the tank, wherein the tank comprises antibacterial stainless steel and wherein the lid comprises fumed silica rubber at least on its inner surface facing the tank opening.

The antibacterial stainless steel preferably comprises chromium, for example at least 15 wt % chromium. In use, a passive layer of chromium oxide forms on the surface of the stainless steel tank. This layer protects the steel from corrosion and can also inhibit the growth of bacteria on the surface.

The antibacterial stainless steel may also comprise manganese, for example at least 1 wt % manganese.

The antibacterial stainless steel may also comprise nickel, for example at least 8 wt % nickel.

In one embodiment, the antibacterial stainless steel comprises about 15 to 25 wt % chromium and optionally about 1 to 2 wt % manganese and optionally about 8 to 12 wt % Nickel.

The antibacterial stainless steel may be austenitic stainless steel, for example austenitic steel SUS 316.

An example of antibacterial stainless steel has the following composition:

0.017 to 0.021 wt % carbon
0.510 to 0.630 wt % Silicon
1.200 to 1.500 wt % Manganese
0.027 to 0.034 wt % Potassium
about 0.001 wt % Sulphur
15.000 to 18.300 wt % Chromium
9.000 to 11.0320 wt % Nickel
Trace of Nitrogen
Balance Iron The antibacterial stainless steel may have a density in the range of 7.95 to 8.05 g/cm$^3$. In one example, the antibacterial stainless steel has a density of 8.03 g/cm$^3$. Such a density assists in reflecting internal energy and enhancing the cleaning effect of the ultrasonic cleaning device.

A base portion of the tank may have a thickness of at least 0.3 mm, preferably in the range of 0.3 mm to 0.5 mm and most preferably about 0.4 mm.

One or more side portions of the tank may have a thickness of at least 0.3 mm, preferably in the range of 0.3 mm to 0.5 mm and most preferably about 0.4 mm.

The tank may have an internal width in the range of 70 mm to 100 mm, preferably 75 mm to 90 mm and most preferably about 85 mm. The internal width is an internal diameter in a preferred embodiment.

The tank may have a height in the range of 30 mm to 50 mm, preferably 35 mm to 45 mm and most preferably about 38 mm.

The tank may hold between 73 cm$^3$ and 160 cm$^3$ of liquid during the cleaning treatment.

Adding sterilising tablets to the liquid inside the tank, during use of the ultrasonic cleaning device, may be beneficial.

The lid comprises silicone rubber at least on its inner surface facing the tank opening, the silicone rubber comprising fumed silica.

In one embodiment, the lid comprises silicone rubber on its inner surface facing the tank opening and on the perimeter of the lid. The lid perimeter is preferably configured to seal the tank opening.

Incorporating fumed silica into a silicone polymer can provide greater composite material strength.

The silicone rubber may be Heat Cured Rubber (HCR).

The use of silicone rubber comprising fumed silica enhances the antibacterial properties of the inner surface of the lid and reduces the potential for aerosol dispersion of oral bacteria.

Also, the fumed silica particles can enhance the hydrophobic (water-repelling) nature of silicone rubber. This property is particularly beneficial in preventing moisture accumulation on the inner surface of the lid, reducing the likelihood of bacterial growth and making the lid material easier to clean and sterilize.

While silicone rubber comprising fumed silica is generally smooth, the fumed silica provides a microscopic roughness which can increase the surface area of the material, potentially allowing for better bonding with antimicrobial coatings or agents.

Silicone rubber comprising fumed silica has been found by the inventor to be particularly effective in preventing aerosol dispersion, due to its enhanced sealing properties and increased material density.

The embedded fumed silica particles in the silicone polymer contribute to a more robust and durable material, ensuring a tighter and more consistent seal. This minimises the escape of aerosols, which is important for maintaining cleanliness and preventing cross-contamination in dental hygiene contexts.

Additionally, the resistance of the silicone rubber to warping and deformation, even under varying environmental conditions, helps maintain the integrity of the seal over time, further reducing the risk of aerosol leakage.

The thickness of silicone rubber used for the inner surface of the lid may be selected to enhance sound transmission when the ultrasonic cleaning device is in use.

The inventor has found that use of ultrasound together with the antibacterial properties of the tank and the lid work synergistically to reduce microbial load and prevent the growth of bacteria on the tank's surface and the inner surface of the lid. This enhances the cleaning efficiency of the ultrasonic cleaning device.

The use of ultrasound together with the antibacterial properties of the tank and the lid also contribute to the longevity and maintenance of the ultrasonic cleaning device. The antibacterial properties of the tank and the lid reduce the risk of biofilm formation, thereby ensuring the device remains hygienic and effective over long-term use.

According to a third aspect of the present invention, there is provided an ultrasonic cleaning device for oral appliances, comprising a tank for holding a liquid and at least one oral appliance, an ultrasonic transducer arranged to convey ultrasound signals (i.e. ultrasonic waves) to the tank, and a control circuit for driving the transducer, the control circuit arranged to provide at least a first mode and a second mode, the first mode comprising a first period during which an ultrasound signal is arranged to be provided at a first amplitude, and the second mode comprising at least a second period during which an ultrasound signal is arranged to be provided at the second amplitude followed by a third period during which an ultrasound signal is arranged to be provided at the third amplitude, following by a fourth period during which an ultrasound signal is arranged to be provided substantially at the second amplitude, and wherein the second, third and fourth periods are substantially equal and shorter than the first period and the third amplitude is substantially lower than the second amplitude.

The lower power periods (or off periods) in the second mode provides a number of benefits, including settling of the cleaning liquid and reduction in hot spots. Other benefits include optimised heat management, enhanced cleaning efficiency and prolonged device life.

One problem with the ultrasonic cleaning of oral appliances is that the oral appliances may be prone to floating during ultrasonication, particularly if an oral appliance is only marginally denser than water: this may be the case if it is made of plastic (for example). When an oral appliance is floating in the liquid in the tank, the appliance is not fully submerged, resulting in the non-submerged parts not being subject to cavitation action and thus not being effectively cleaned. The present inventor believes that floating may be attributable to cavitation bubble dynamics and/or agitation of the liquid in the tank.

In relation to cavitation bubble dynamics, since an ultrasonic cleaning process generates millions of tiny cavitation bubbles in a liquid, if a significant number of these bubbles attaches to the surface of an oral appliance submerged in the liquid, the bubbles may decrease the overall density of the appliance-bubble combination, allowing the appliance to rise or float temporarily. Use of the lower power periods (or off periods) allows these bubbles to collapse or to detach from the appliance such that the appliance may resume its normal buoyancy and resubmerge, ready for a subsequent period of ultrasonic cleaning.

In relation to agitation of the liquid, the intense agitation of the liquid in the tank caused by the ultrasonic waves may create currents and turbulence strong enough to lift or suspend the oral appliance(s). This relates to fluid dynamics rather than to a change in buoyancy. Once the agitation ceases in the lower power periods (or off periods), the appliance(s) will resubmerge, ready for a subsequent period of ultrasonic cleaning.

In a preferred embodiment the second mode further comprises a fifth period during which an ultrasound signal is arranged to be provided substantially at the third amplitude and a sixth period during which an ultrasound signal is arranged to be provided substantially at the second amplitude. This provides a further cleaning cycle and consequent better cleaning.

In preferred embodiments the fifth and sixth periods are substantially equal to the second, third and fourth periods.

In preferred embodiments the first period is 10 minutes or less and more preferably between 3 minutes and 7 minutes, and more preferably between 4 minutes and 6 minutes.

In preferred embodiments the second amplitude is substantially the same as the first amplitude.

In preferred embodiments the device further comprises a current sensor arranged to detect the current drawn by the ultrasonic transducer and the control circuit is further arranged to activate the transducer prior to the first and second periods to emit a range of frequencies while measuring the current, the control circuit being further arranged to select a frequency corresponding substantially to the highest current drawn. This allows for optimum frequency selection during cleaning cycles. The range of frequencies are preferably emitted over a duration of substantially 10 seconds.

The power of the ultrasonic transducer is preferably between 20 and 40 W, more preferably between 24 and 31 W and still more preferably between 29 and 31 W.

In preferred embodiments, the control circuit is arranged to vary the frequency of the drive signal to the ultrasonic transducer during the first, second, fourth and sixth periods. In preferred embodiments, the control circuit is arranged to vary the frequency over a range of between 2 kHz and 10 kHz.

In preferred embodiments, the control circuit is arranged to pulse the drive signal to the ultrasonic transducer during the first, second, fourth and sixth periods. The control circuit is preferably arranged to pulse the drive signal at substantially 20 times per second.

In preferred embodiments, the control circuit is arranged to pulse the drive signal to the ultrasonic transducer during the third and fifth periods. The control circuit is preferably arranged to pulse the drive signal at a rate of between 5 times per second and once every 5 seconds.

In preferred embodiments the third amplitude is zero.

In a final aspect, the present invention provides a cleaning method for oral appliances using the device of any preceding aspect of the invention, the method comprising: filling the tank of the device with liquid; introducing one or more oral appliances into the tank; mounting the container on the power supply base; driving the ultrasonic transducer via the power supply base; and vibrating the liquid with ultrasonic waves to clean the or each oral appliance.

The oral appliance(s) may be introduced into the tank either before or after it is filled with liquid.

When liquid fills an empty tank, the oral appliance(s) may be introduced into the tank either before or after the container is mounted on the power supply base.

BRIEF DESCRIPTION OF THE DRAWINGS

The present invention will now be described, by way of example only, with reference to the accompanying diagrammatic drawings, in which.

DESCRIPTION OF EXAMPLE EMBODIMENTS

Figure 1:
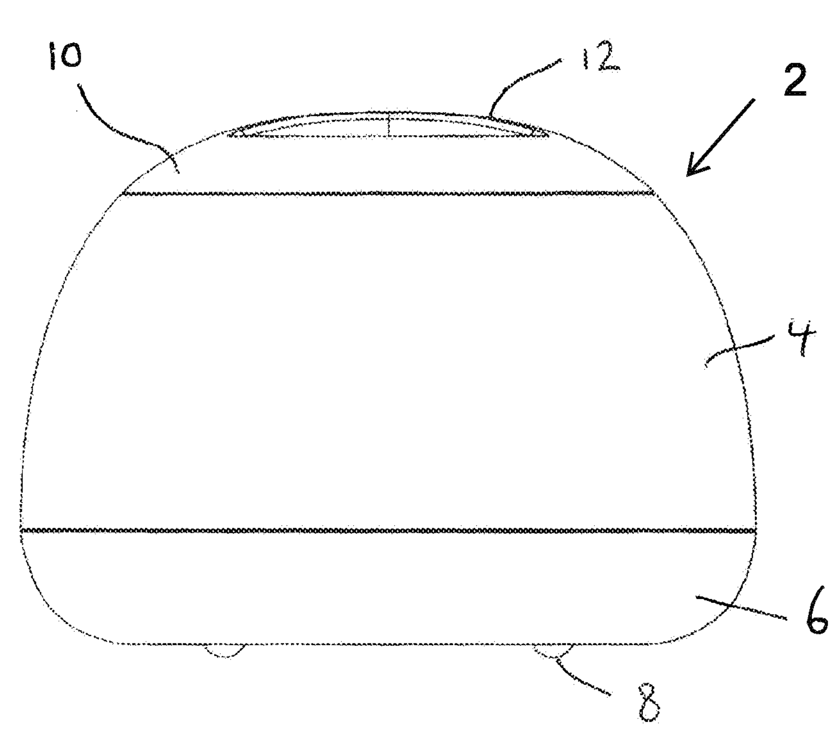
FIG. 1 is a side view of an ultrasonic cleaning device comprising a container and a base, according to one embodiment of the present invention.
Figure 2:
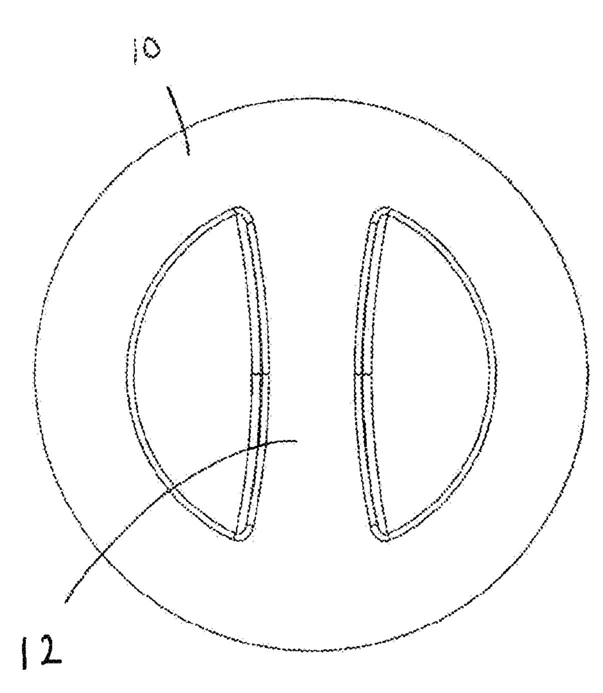
FIG. 2 is a plan view of a lid of the container.

Referring to FIG. 1, an ultrasonic cleaning device 2 for oral appliances comprises a container 4 and a base 6.

Base 6 may be weighted for stability during operation of the ultrasonic cleaning device. In one example, the base weighs 150 grams.

Base 6 optionally has feet 8 to provide stability (shown in FIG. 1 only). Feet 8 may be of a relatively high-friction material such as acrylonitrile butadiene styrene to hinder travel of the ultrasonic cleaning device along a surface during use.

In this embodiment, container 4 is substantially dome-shaped with a substantially circular perimeter in plan view and base 6 is substantially circular in plan view.

Figure 3:
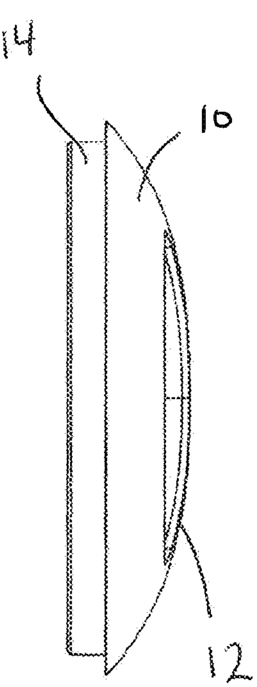
FIG. 3 is a side view of the lid of FIG. 2.
Figure 4:
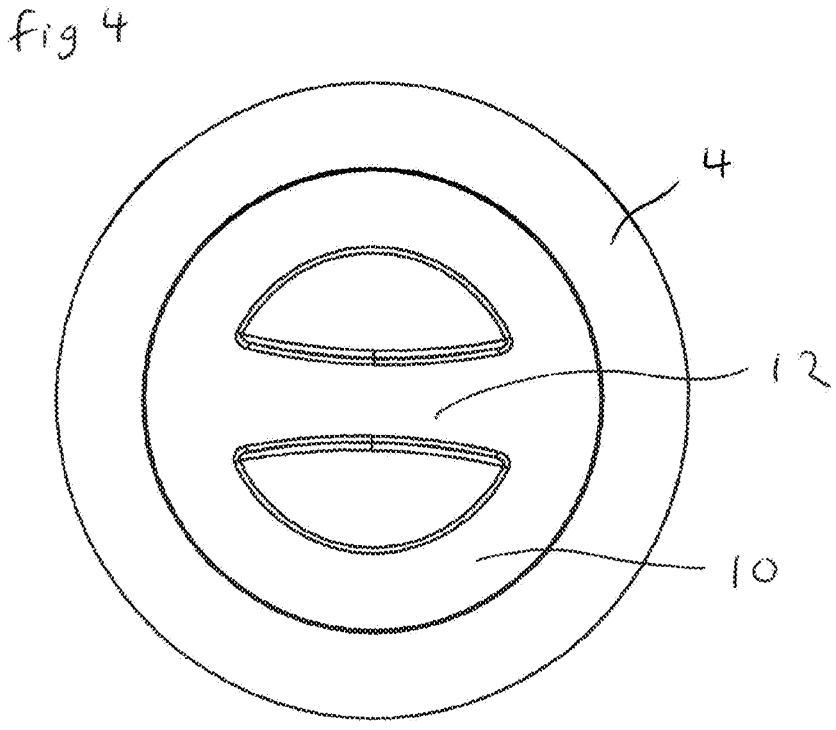
FIG. 4 is a plan view of the ultrasonic cleaning device of FIG. 1.

Container 4 is provided with a removable lid 10 having a handle portion 12 on its upper surface, as shown in FIGS. 1 to 4. Referring to FIG. 3, the lid has an inner surface portion 14 which faces the tank opening and acts as a gasket.

Figure 5:
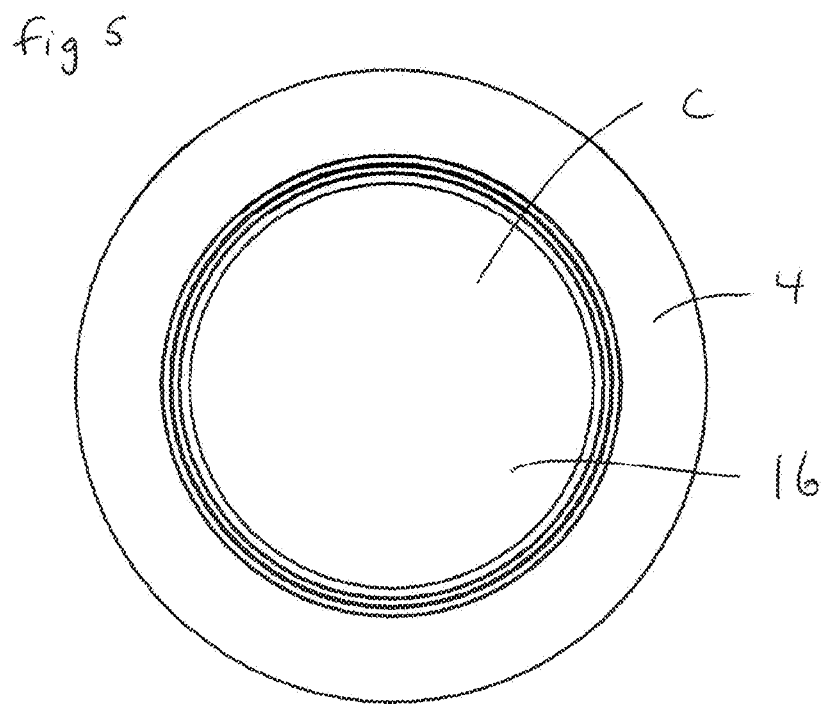
FIG. 5 is a plan view of the ultrasonic cleaning device of FIG. 1 with the lid removed.
Figures 6A, 6B:
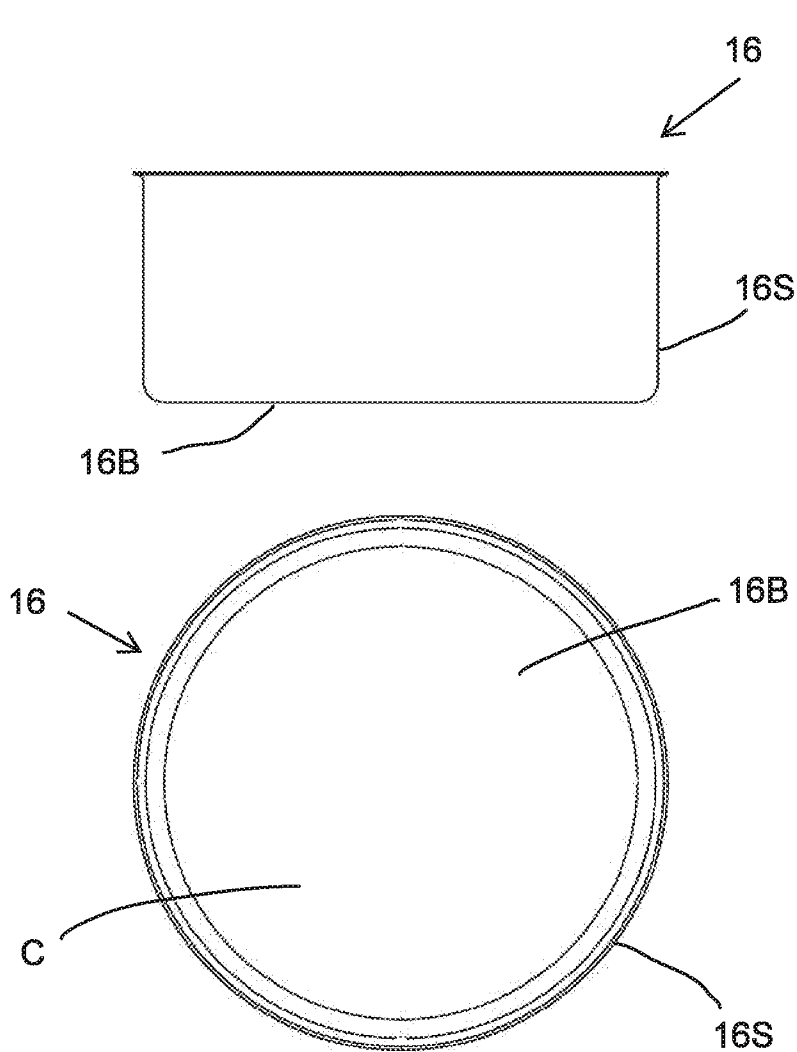
FIG. 6*a* is a side view of a tank to be housed in the container.
FIG. 6*b* is a plan view of the tank.

Referring to FIGS. 5, 6*a* and 6*b*, container 4 comprises a tank 16 which is cylindrical in shape in this embodiment. Tank 16 has a base portion 16B and one or more side portions 16S upstanding from the base portion to define an internal cleaning chamber C for receiving one or more oral appliances. In use of ultrasonic cleaning device 2, ultrasonic waves are conveyed to a liquid in tank 16. Lid 10 is configured to seal the tank.

The tank has an internal diameter of 85 mm and a volume of 215 ml in one example.

Container 4 is detachably mounted on base 6.

Figure 7:
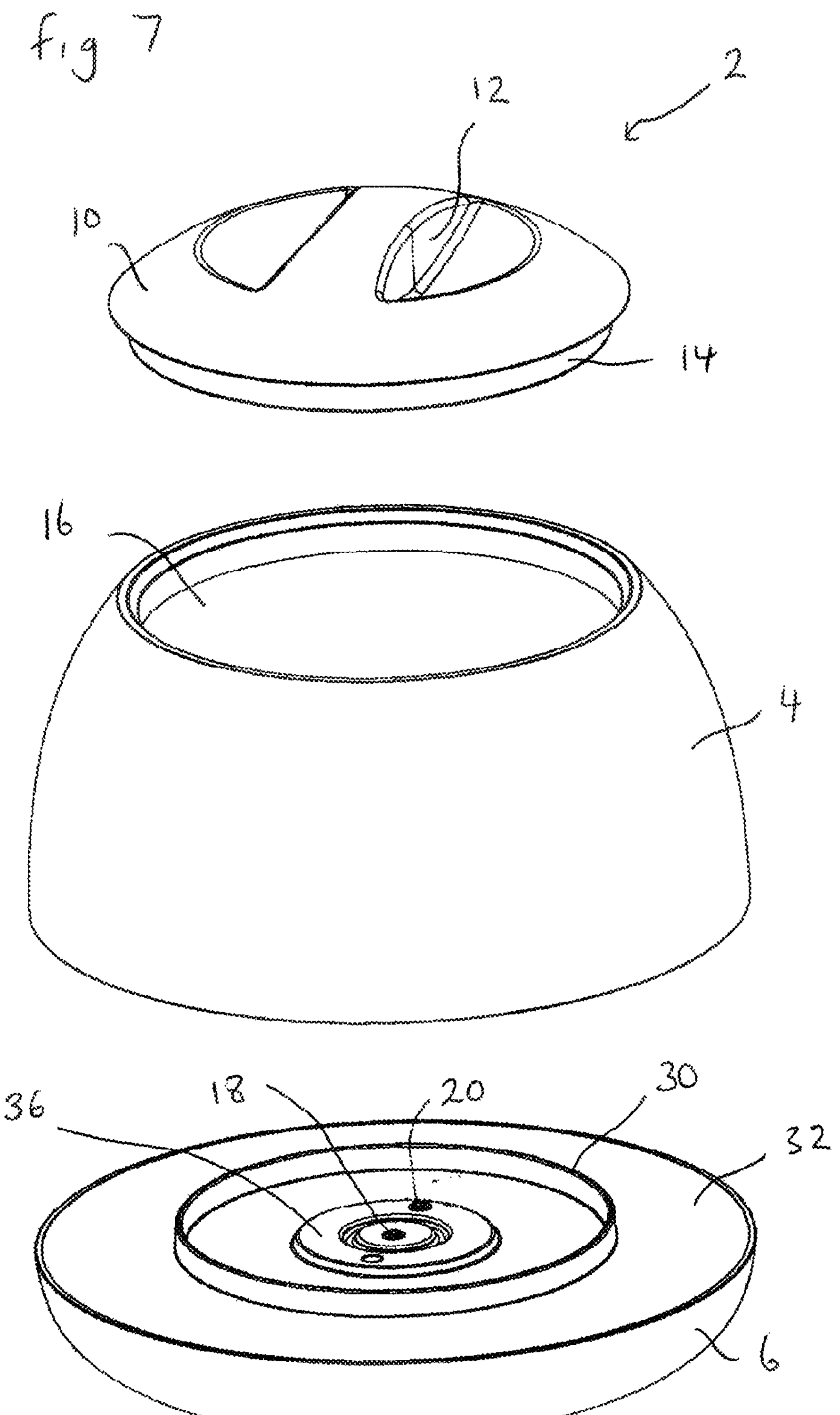
FIG. 7 is an exploded top and side perspective view of the ultrasonic cleaning device showing a mounting surface of the base.
Figure 10:
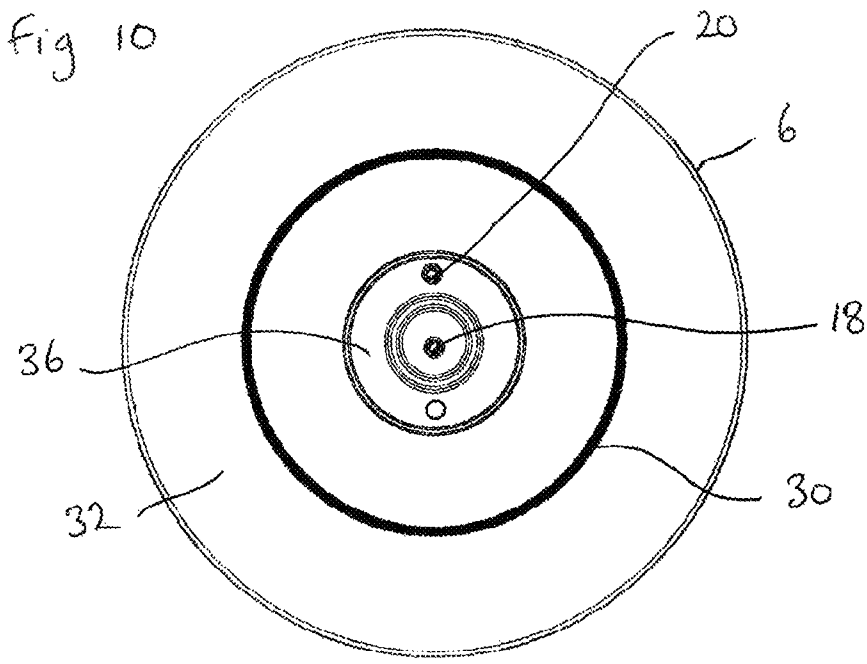
FIG. 10 is a plan view of the mounting surface of the base.

Referring to FIGS. 7 and 10, base 6 is a power supply base comprising electrical connection means provided by base inner contact member 18 and base outer contact member 20. In this embodiment, base inner contact member 18 is a projection and base outer contact member 20 is a projection. Base outer contact member 20 is radially spaced from base inner contact member 18.

Base 6 is provided with a socket for connection of the electrical connection means to a cable (not shown) to an external electrical source. Base 6 may be connected to a 5V DC output voltage power supply using a power jack or powered using a USB-C connection. Alternatively, base 4 may be powered by a battery being a disposable or re-chargeable battery.

Figure 8:
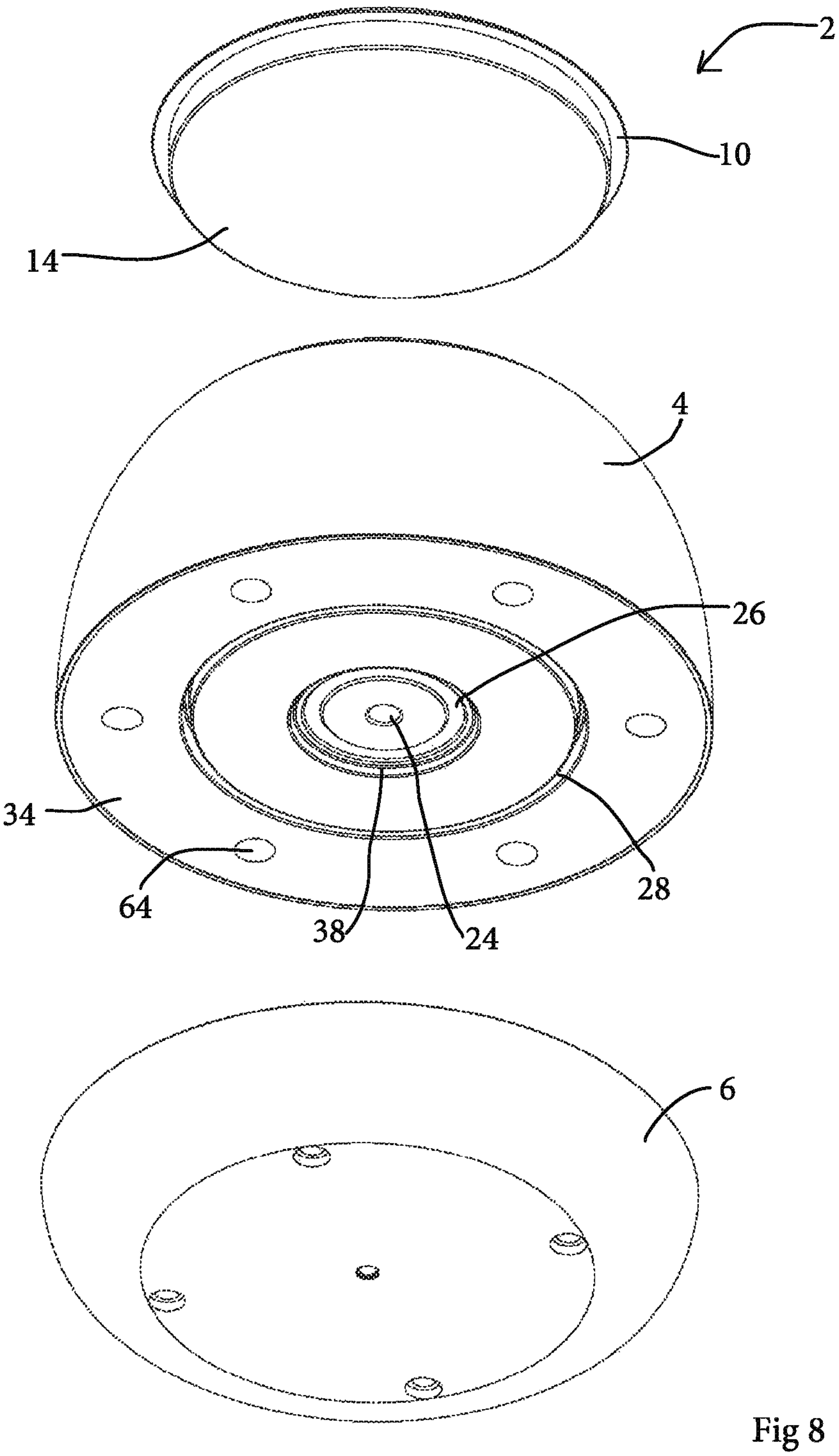
FIG. 8 is an exploded bottom and side perspective view of the ultrasonic cleaning device showing a mounting surface of the container.
Figure 9:
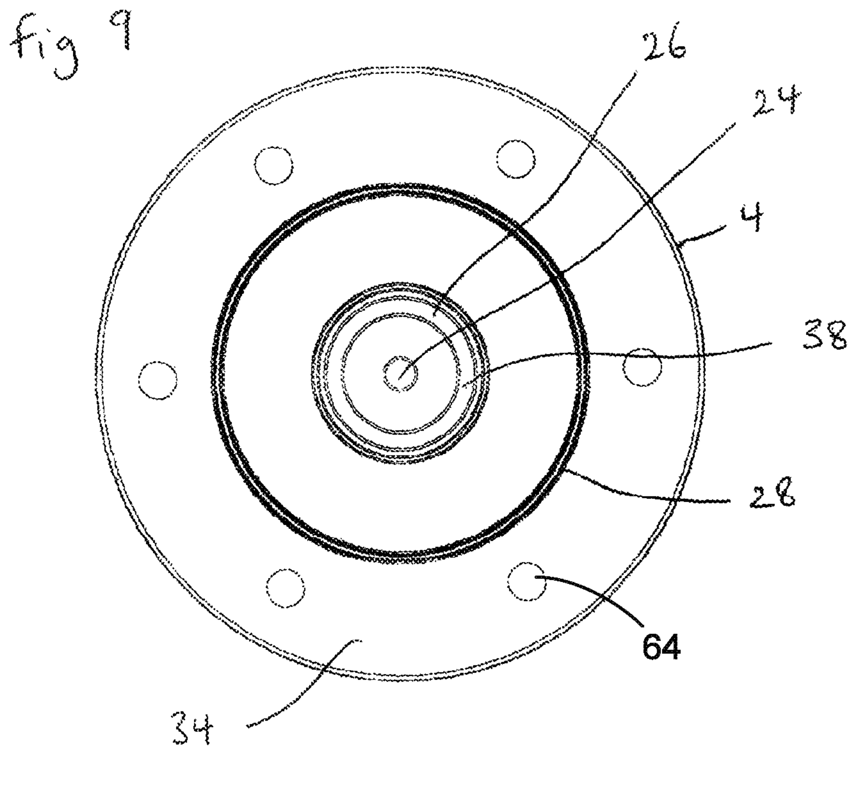
FIG. 9 is a plan view of the mounting surface of the container.

Referring to FIGS. 8 and 9, container 4 is provided with corresponding electrical connection means configured for cooperation with the electrical connection means of base 6 when the container is mounted on the base. The electrical connection means of container 4 is provided by container inner contact member 24 and container outer contact member 26. In this embodiment, container inner contact member 24 is circular and container outer contact member 26 is annular and concentric with container inner contact member 24. These contact members are generally planar, providing planar contact surfaces.

The respective contact members are generally made from metals and metal alloys with high electrical conductivity. The most commonly used metal surfaces for electrical contacts are silver, copper, gold, platinum, and palladium.

Base inner contact member 18 is adapted to contact container inner contact member 24 in use to make an electrical connection. Base outer contact member 20 is adapted to contact container outer contact member 26 in use to make an electrical connection.

Container 4 is provided with a groove 28 configured to accommodate a barrier ridge 30 provided on base 6. Barrier ridge 30 surrounds the inner and outer contact members of the base and of the container when the container is mounted on the base, thereby hindering ingress of liquid towards the respective inner and outer contact members in use of the ultrasonic cleaning device. In this embodiment, groove 28 and barrier ridge 30 are annular. Neither groove 28 nor barrier ridge 30 are electrical connection means: they are physical features rather than electrical features.

The barrier ridge prevents wicking of liquid by capillary action towards the respective inner and outer contact members of container 4 and base 6, providing a barrier to water ingress to prevent corrosion of these contact members.

Barrier ridge 30 also hinders relative sliding motion between opposing mounting surfaces of container 4 and base 6 and therefore prevents damage to the projecting base contact members 18, 20 (which may be connector pins) when the container is mounted and detached from the base.

Barrier ridge 30, base inner contact member 18 and base outer contact member 20 extend from the same surface of base 6, being a mounting surface 32. The projections of base contact members 18, 20 may be retractable.

Container inner contact member 24 and container outer contact member 26 are provided on an opposing mounting surface 34 of the container.

The respective inner contact members are centrally positioned at an axis of rotation of the ultrasonic cleaning device.

The opposing mounting surfaces 32, 34 are substantially planar: they may be hydrophobic.

Mounting surface 32 of base 6 is provided with an annular projecting portion 36 and barrier ridge 30.

Mounting surface 34 of container 4 is provided with an annular recessed portion 38 and groove 28. When the container is mounted on the base, opposing mounting surfaces of the container and the base are thereby shaped to substantially inter-fit.

In this embodiment, these protrusions on the base (i.e. projecting portion 36 and barrier ridge 30) and these recesses on the container (i.e. recessed portion 38 and groove 28) are respective means for alignment of the container on the base in any radial orientation of the container relative to a central axis of the base.

Container 4 is rotatable on base 6 about the central axis of the base. Container 4 is detachably mounted on base 6 via a central connection, provided at least in part by projecting portion 36 and recessed portion 38, to provide a centring arrangement.

Figure 11:
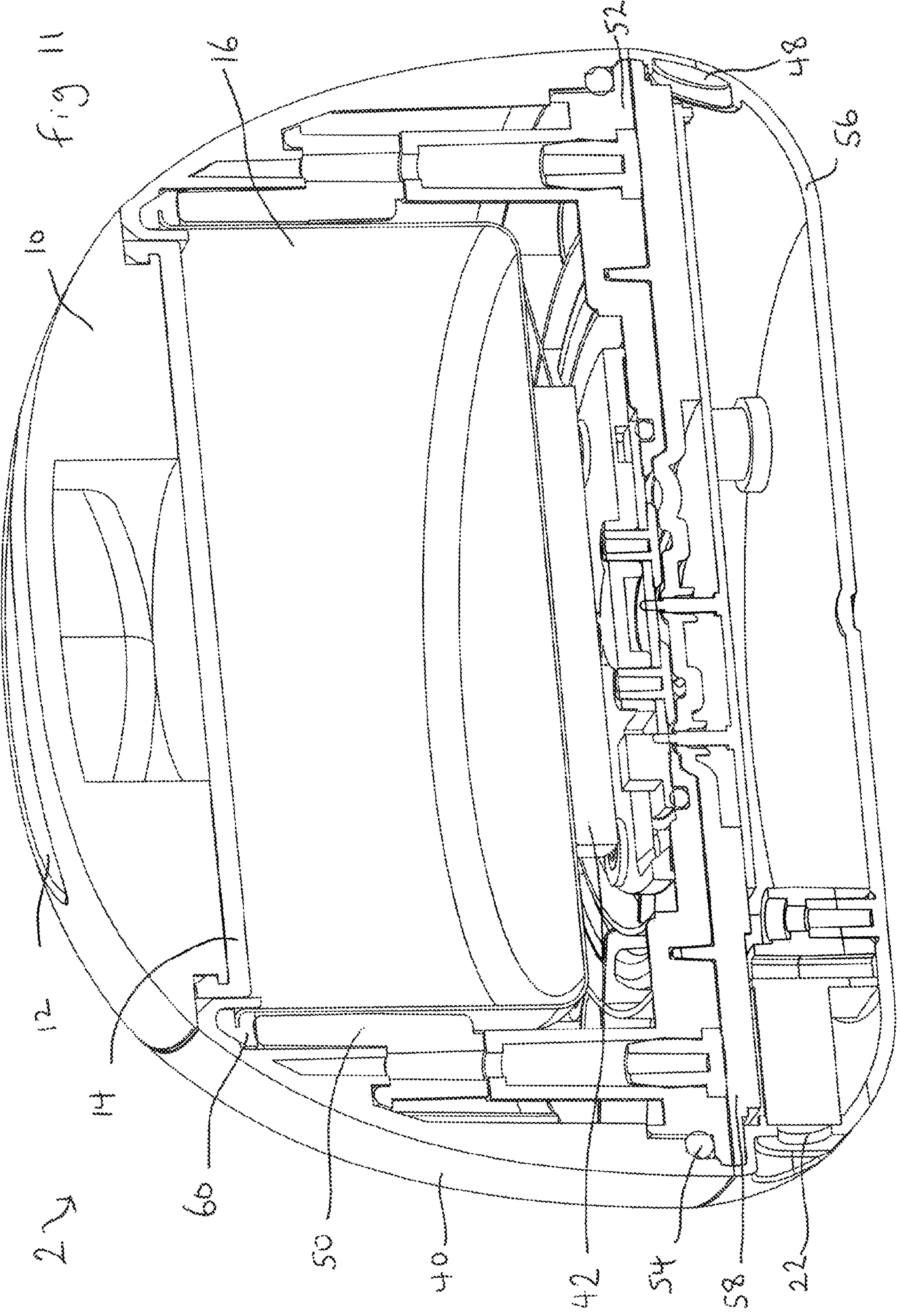
FIG. 11 is a perspective, vertical cross-sectional view through a central axis of the ultrasonic cleaning device of FIG. 1.
Figure 12:
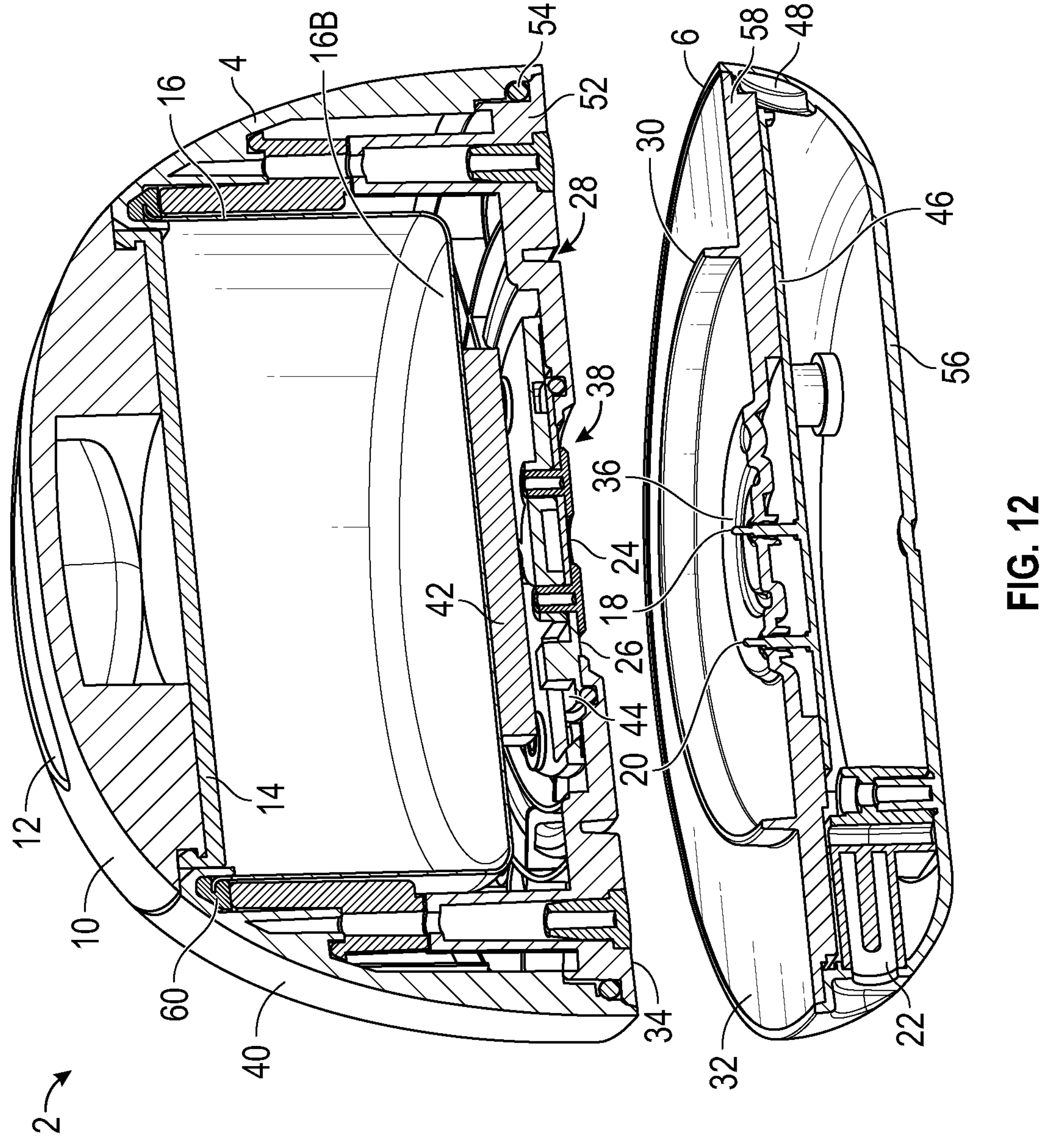
FIG. 12 is a perspective, vertical cross-sectional view through a central axis of the ultrasonic cleaning device of FIG. 1 with the container detached from the base.

Referring to FIGS. 11 and 12, container 4 comprises a housing 40 for tank 16 and other components of the ultrasonic cleaning device. The housing also provides sound insulation.

An ultrasonic transducer 42 is located in the housing externally of the tank. The ultrasonic transducer is therefore located externally of cleaning chamber C and is adjacent the base portion 16B of the tank.

Ultrasonic transducer 42 is connected to a container circuit board 44 which is connected to a base circuit board 46 via the electrical connection means of container 4 and base 6 (i.e. base inner contact member 18, base outer contact member 20, container inner contact member 24, container outer contact member 26) when the container is mounted on the base. A power supply is electrically connected to ultrasonic transducer 42 via these contact members.

Figure 13:
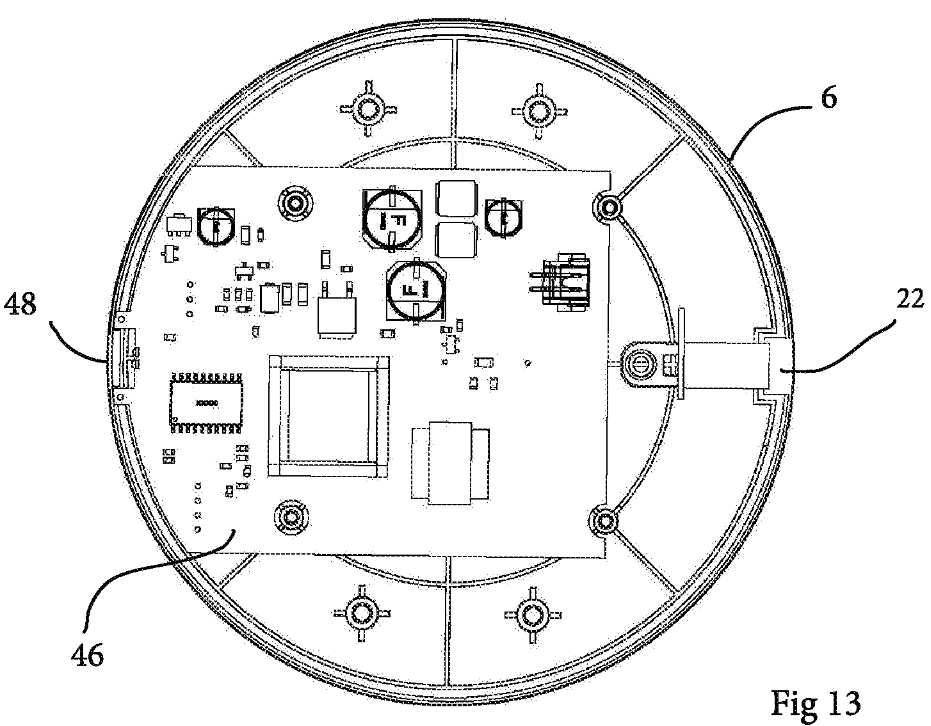
FIG. 13 is a horizontal cross-sectional view through the base.

Referring to FIGS. 11 to 13, base circuit board 46 is connected to socket 22 (for a DC plug in this example) and an on/off button 48, all provided by base 6.

Housing 40 is provided with a tank fixing plate 50 surrounding the sides of the tank and a bottom cover plate 52 which provides container mounting surface 34. A sealing ring 54 seals against water ingress adjacent the bottom cover plate.

Housing 40 is also provided with a tank sealing ring 60 adjacent lid inner surface portion 14 which acts as a gasket: together, tank sealing ring 60 and lid inner surface portion 14 act to seal the tank during use of the ultrasonic cleaning device to prevent aerosols containing potentially-harmful bacteria escaping from the tank.

Base 6 comprises a housing 56 which is provided with a cover plate 58 which provides base mounting surface 32.

Figure 14:
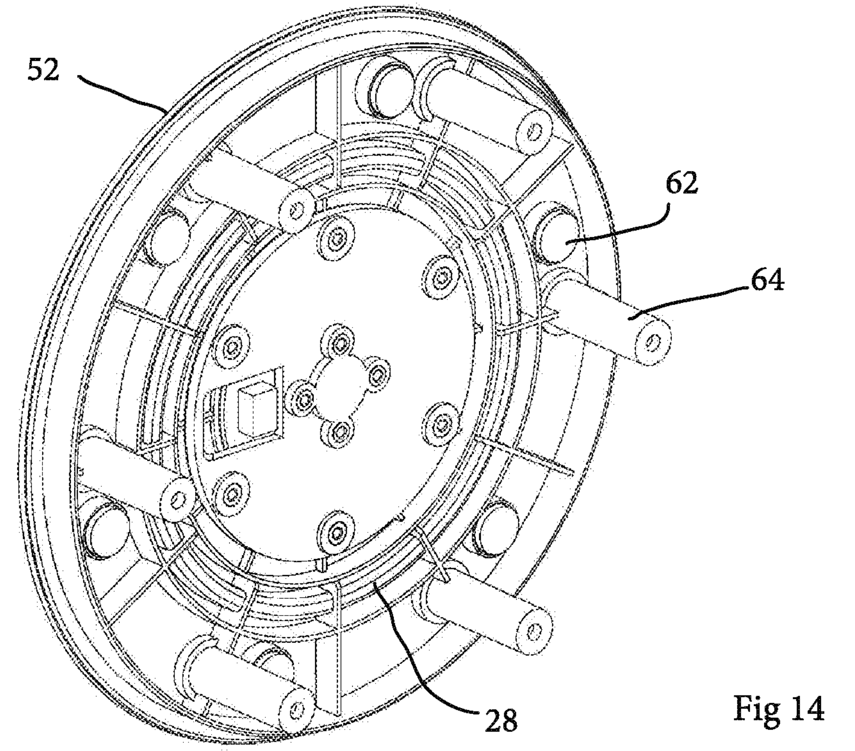
FIG. 14 is perspective view of an underside of the mounting surface of the container, separated from the rest of the container.

The underside of bottom cover plate 52 of the container is shown in FIG. 14 separated from the remainder of housing 40.

Bottom cover plate 52 is provided with six magnets 62 to allow container mounting surface 34 to magnetically connect to base mounting surface 32 via ferromagnetic portions (not shown) provided in base 6, thereby supplementing the connection between the container and the base. Magnets 62 are annularly-spaced by angles of approximately 60 degrees measured from the centre of the container mounting surface which is a central axis of the container and, in this embodiment, is the location of container inner contact member 24. The presence of magnets is optional and the number of magnets when present may be less than or more than six.

The underside of groove 28 is visible in FIG. 14 as are screw hole plugs 64, the exterior surface of these plugs also being visible in FIGS. 8 and 9.

A suitable material for tank 16 is austenitic stainless steel such as SUS 316 stainless steel which is available from available from POSCO (Zhangjiagang) Stainless Steel Co., Ltd, Zhangjiagang City, PRC. This stainless steel has antibacterial properties.

The composition of an example of a suitable stainless steel is:

0.0191 wt % carbon 0.571 wt % Silicon 1.360 wt % Manganese 0.0302 wt % Potassium 0.0010 wt % Sulphur 16.632 wt % Chromium 10.028 wt % Nickel 129 ppm Nitrogen Balance Iron The following experiments were carried out to demonstrate the antibacterial effect of this stainless steel. No ultrasound was applied during the experiments. The bacteria were placed in a tank of antibacterial stainless steel for 24 hours (the treated specimen) and compared with bacteria placed on a non-antibacterial plastic sheet for 24 hours (the untreated specimen).

Bacteria—*Escherichia coli* ATCC 8739—Concentration of inoculum $9.4\times10^5$ CFU/mL.

| Test Specimen | Average number of viable bacteria recovered from test specimen (CFU/cm$^2$) | The logarithm of the average number of viable bacteria recovered from test specimen |
|---|---|---|
| The untreated specimen, immediately after inoculation | $1.7 \times 10^4$ | 4.23 |
| The untreated specimen, inoculated, after 24 hours | $3.8 \times 10^5$ | 5.58 |
| The treated specimen, inoculated, after 24 hours | 8.1 | 0.91 |

It can be seen that the material of the tank had a powerful antibacterial effect.

Lid 10 comprises silicone rubber on its inner surface facing the tank opening and on the perimeter of the lid to provide lid inner surface portion 14. This perimeter of the lid is able to seal the tank opening such that lid inner surface portion 14 acts as a gasket.

The silicone rubber comprises fumed silica. Inner surface portion 14 of the lid is thereby provided with antibacterial and hydrophobic properties. The thickness of the silicone rubber used for the inner surface of the lid is 2.25 mm in one embodiment.

A suitable example of a silicone rubber is a heat cured silicone rubber such as CENUSIL® R250 CN HCR silicone rubber from Wacker Chemie AG, Germany. It has a Hardness Shore A of 50, a density of 1.1 4 g/cm$^3$, a tensile strength of 10 N/mm$^2$ and a tear strength of 22 N/mm. The lid may also comprise acrylonitrile butadiene styrene, for example on its outer surface. This plastic material tends to have a soft touch and be easy to wipe clean. The housing of the container and/or the base may also comprise acrylonitrile butadiene styrene.

Figure 15:
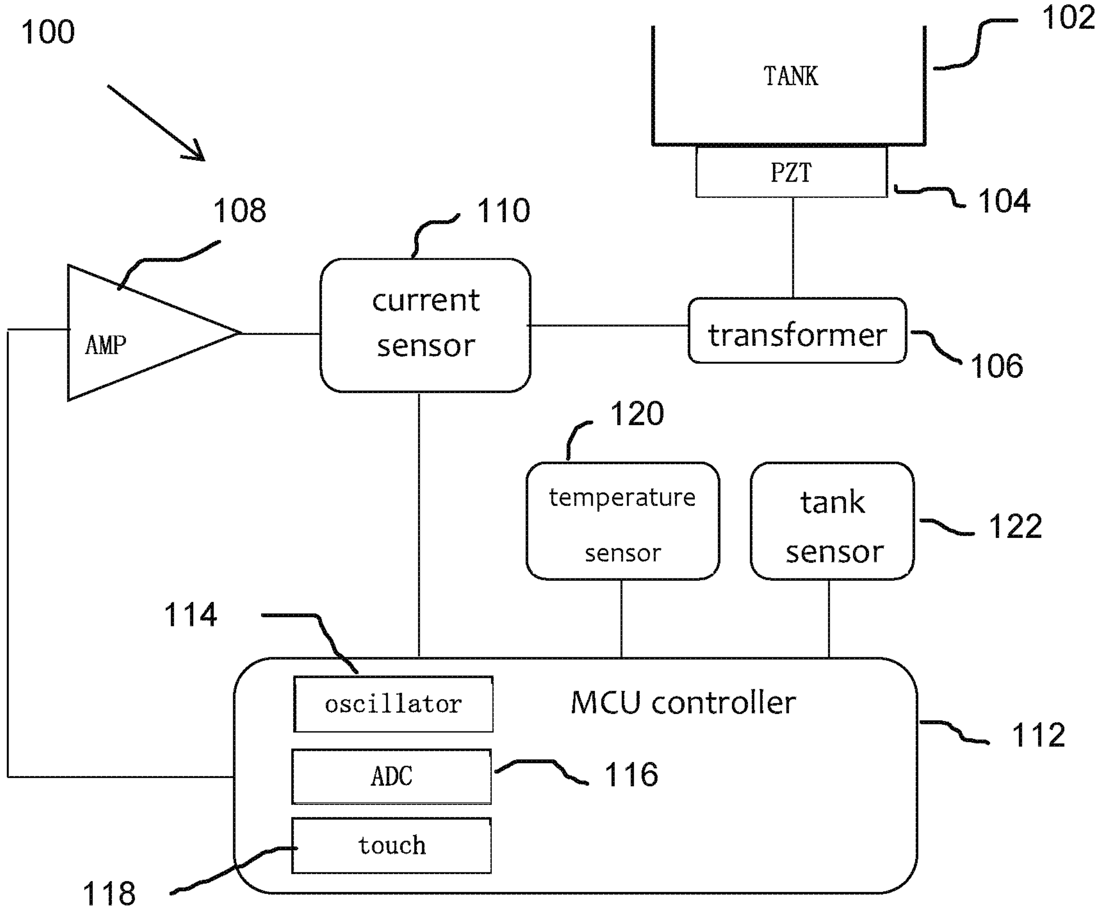
FIG. 15 is a block schematic diagram of a drive circuit for an ultrasonic cleaning device flow chart of one embodiment of a dual cleaning mode.

FIG. 15 shows a block schematic diagram 100 of a drive circuit for an ultrasonic cleaning device. A tank 102 is provided which is mechanically coupled to a piezo electric transducer (PZT) 104. The PZT is preferably attached at the bottom of the tank as shown: it is mounted in any manner that conveys the oscillations of the PZT to the tank, and hence to any contents of the tank.

The PZT 104 is driven by a transformer 106 which is fed from an amplifier 108 via a current sensor 110. A master control unit (MCU) 112 includes an oscillator 114, an analogue-to-digital converter (ADC) 116 and a touch sensor 118. The oscillator 114 of the MCU is connected to the amplifier 108 and the ADC of the MCU is connected to receive an output from the current sensor 110.

The drive circuit also comprises a temperature sensor 120 for measuring the temperature of the PZT 104 and a tank sensor 122 for measuring the contents of the tank. Both sensor 120 and sensor 122 are connected to MCU 112.

The drive circuit is thus arranged to oscillate the contents of the tank, measure the drive current and temperature of the PZT and measure the contents of the tank. An example of the operation of the drive circuit will be described with reference to FIG. 16.

Figure 16:
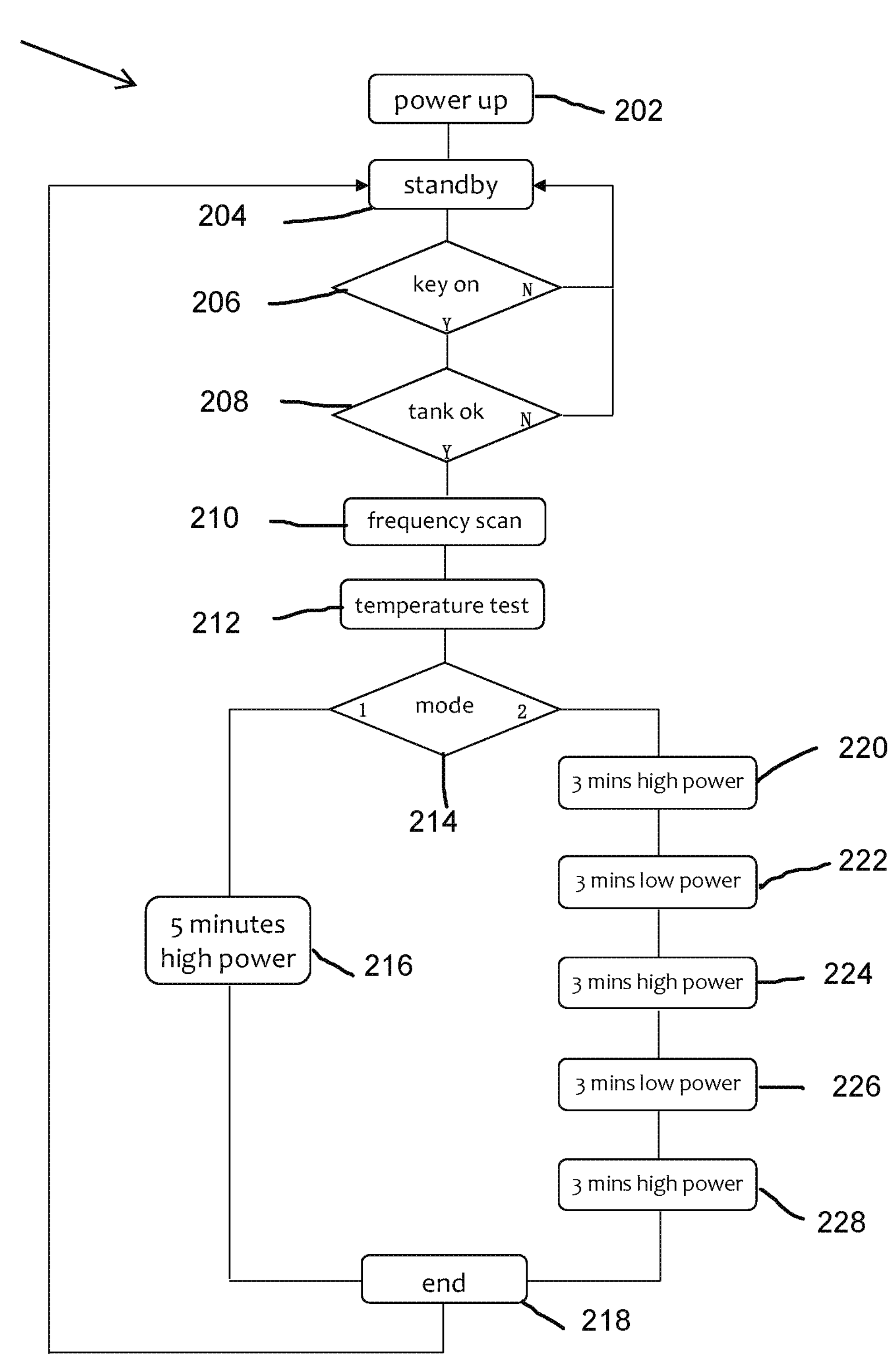
FIG. 16 is a flowchart showing different modes of operation of an ultrasonic cleaning device.

FIG. 16 shows a flowchart 200 showing different modes of operation of an ultrasonic cleaning device. After power up at step 202, the drive circuit enters a standby mode and at decision step 206, it detects whether it has been activated, for example via the touch sensor 118. If not, processing returns to standby step 204.

If decision step 206 determines that the unit has been activated, then processing continues to check the tank at step 208, for example using the tank sensor 122. The tank is checked at least to ensure that there is an adequate level of liquid therein. If the liquid level (or further checks) is/are not adequate then the unit returns to standby mode 204.

If the tank check(s) is/are performed satisfactorily then processing continues to a frequency scan 210 and a temperature test 212. The frequency scan step comprises operating the PZT at a range of different frequencies, for example a sweep between 35 kHz and 45 kHz while measuring the current drawn by the PZT. By scanning a range of frequency points and recording the electric current, it is possible to identify the most effective operational frequency under the current conditions (which vary dependent upon the level of cleaning liquid and what appliance is in the tank). That is the frequency that corresponds to a higher (or highest) electric current. The MCU then selects this frequency for the cleaning operation as the choice indicative of enhanced cleaning capability. The frequency scanning step preferably lasts around 10 seconds.

The temperature test is to ensure that the PZT is sufficiently cool to be operated.

Processing continues to step 214 at which a mode is selected. The mode may be selected in response to the frequency scan and/or temperature test, or in response to user input. If mode 1 is selected then processing continues to step 216 at which the PZT is activated for 5 minutes at high power. While 5 minutes is a preferred duration, the high power activation may be maintained for between 1 and 7 minutes up to a maximum of 10 minutes. After the high power duration has ended at step 218, processing continues to standby step 204.

If, at step 214, mode 2 is selected then processing continues to step 220 at which the PZT is activated for 3 minutes at high power. While 3 minutes is the preferred duration, the high power activation may be maintained for between 2 to 5 minutes. After the high power step 220, processing continues to a low power step 222 which is maintained for three minutes. The low power step may comprise the PZT being deactivated, i.e. no drive current is supplied or it may comprise a power level of up to 10% of the high power level. While a duration of three minutes is preferred, the low power step may have a duration of between 2 and 5 minutes, or longer.

After low power step 224, processing continues to step 226 at which high power is maintained for three minutes, as for step 220. The duration may be varied as discussed above. After step 226 processing continues to step 228 in which low power is maintained for 3 minutes. The power level and duration of step 226 may be varied as discussed above. After step 226 processing continues to step 228 which comprises 3 minutes of high power activation of the PZT. Again, the duration of this step may be varied as discussed above. Mode 2 terminates at step 218 and as for mode 1, the drive circuit returns to a standby mode at step 204.

The benefit of the first mode is that the cleaning cycle is completed as quickly as possible.

Benefits of the low power or off period in the second mode include settling and reduction in hot spots. They further include optimised heat management, enhanced cleaning efficiency and prolonged device life.

Ultrasonic cleaning generates heat as a by-product so heat management is important. This mode is intended to be used for users who want to cycle the machine more than once. The 'off', or low power, cycles in the cleaning protocol are designed to allow the heat to disperse, preventing overheating of both the device and the cleaning solution. This controlled temperature management is important for ensuring that the oral appliances are not exposed to excessive heat, which could potentially warp or damage them.

The intermittent pauses (such as 3 minutes off) cause the cleaning solution to de-gas (an important need for ultrasonic cleaning effectiveness) and allow a potential reorientation of the oral appliance to promote cleaning of new areas that might not have been adequately cleaned in the previous 'on' cycle. This ensures a more thorough and uniform cleaning process across the entire surface of the oral appliance.

The 'off', or low power, cycles also enable an oral appliance which has floated during the ultrasonication to sink towards the bottom of the tank which is adjacent the ultrasonic transducer in this embodiment: the ultrasonic cleaning effect is therefore strongest at the base of the tank. Once resubmerged in the liquid in tank, the oral appliance is ready for a subsequent cycle of ultrasonic cleaning.

The alternating cycles also help in maintaining the longevity of the device itself. Continuous operation can strain the ultrasonic generator and other components. By incorporating rest periods, the protocol reduces wear and tear, thereby extending the lifespan of the device. Additionally, this approach minimizes the risk of overheating, ensuring safe operation.

The power range applied to the PZT is typically 29-31 W. Should the PZT be subject to overheating, this may be lowered to between 24 and 27 W.

In both modes, it is preferred to vary the frequency at which the PZT is excited, over a range of at least 2 kHz.

In a preferred embodiment, in both modes, the frequency of the drive signal is pulsed at substantially 20 times per second. The frequency is also preferably swept 5 times per second over a range of at least 2 kHz.

In another preferred embodiment for mode 2, referred to as an "active off" protocol, the controller is arranged to also provide the low power periods with periodic pulsing, preferably at a rate of between 5 pulses per second and 1 pulse every 5 seconds. The pulses are provided at full power and preferably no longer than 1000 microseconds to maintain cooling of the liquid during the low power period.

In use of the ultrasonic cleaning device, container 4 is detached from base 6 and lid 10 is removed from container 4. Tank 16 within container 4 is filled with room temperature water up to a minimum level. An oral appliance is placed into tank 16 (optionally with sterilising tablets) such that the oral appliance is fully submerged. Lid 10 is replaced and container 4 is mounted on base 6 which is connected to a power supply. The ultrasonic cleaning device is switched on using the power button to activate ultrasonic cleaning. A cleaning mode is selected. After waiting for an allotted cleaning time, the cleaned oral appliance is retrieved and rinsed for wearing.

The invention claimed is:

1. An ultrasonic cleaning device for oral appliances, the device comprising:

a container and a base on which the container is detachably mounted;

wherein the container comprises a tank;

wherein the device further comprises an ultrasonic transducer to convey ultrasonic waves to a liquid in the tank;

wherein the base of the device is a power supply base comprising a first connector pin and a first contact surface;

wherein the container is provided with a second connector pin and a second contact surface configured for cooperation with the first connector pin and the first contact surface respectively of the power supply base when the container is mounted on the base;

wherein the first connector pin is adapted to contact the first contact surface in use to make an electrical connection and the second connector pin is adapted to contact the second contact surface in use to make an electrical connection;

wherein at least one barrier ridge surrounds the first and second connector pins and the first and second contact surfaces when the container is mounted on the base, the at least one barrier ridge being configured to hinder ingress of liquid towards the first and second connector pins and the first and second contact surfaces in use of the device, wherein the at least one barrier ridge includes at least one barrier ridge provided on a mounting surface of the container and/or the base.

2. An ultrasonic cleaning device for oral appliances, the device comprising:

a container and a base on which the container is detachably mounted;

wherein the container comprises a tank;

wherein the device further comprises an ultrasonic transducer to convey ultrasonic waves to a liquid in the tank;

wherein the base of the device is a power supply base comprising a first contact surface and a second contact surface;

wherein the container is provided with a first connector pin and a second connector pin configured for cooperation with the first contact surface and the second contact surface respectively of the power supply base when the container is mounted on the base;

wherein the first connector pin is adapted to contact the first contact surface in use to make an electrical connection and the second connector pin is adapted to contact the second contact surface in use to make an electrical connection;

wherein at least one barrier ridge surrounds the first and second connector pins and the first and second contact surfaces when the container is mounted on the base, the at least one barrier ridge being configured to hinder ingress of liquid towards the first and second connector pins and the first and second contact surfaces in use of the device, wherein the at least one barrier ridge includes at least one barrier ridge provided on a mounting surface of the container and/or the base.

3. The ultrasonic cleaning device as claimed in claim 2, wherein the at least one barrier ridge, the first connector pin and the second connector pin extend from a mounting surface of the container, the at least one barrier ridge being configured to protect the first and second connector pins from damage when the container is mounted and detached from the base.

4. An ultrasonic cleaning device for oral appliances, the device comprising:

a container and a base on which the container is detachably mounted;

wherein the container comprises a tank;

wherein the device further comprises an ultrasonic transducer to convey ultrasonic waves to a liquid in the tank;

wherein the base of the device is a power supply base comprising a first connector pin and a second connector pin;

wherein the container is provided with a first contact surface and a second contact surface configured for cooperation with the first connector pin and the second connector pin respectively of the power supply base when the container is mounted on the base;

wherein the first connector pin is adapted to contact the first contact surface in use to make an electrical connection and the second connector pin is adapted to contact the second contact surface in use to make an electrical connection;

wherein at least one barrier ridge surrounds the first and second connector pins and the first and second contact surfaces when the container is mounted on the base, the at least one barrier ridge being configured to hinder ingress of liquid towards the first and second connector pins and the first and second contact surfaces in use of the device, wherein the at least one barrier ridge is provided on a mounting surface of the container and/or the base.

5. The ultrasonic cleaning device as claimed in claim 1, wherein the at least one barrier ridge, the first connector pin, and the second connector pin extend from a mounting surface of the base, the at least one barrier ridge being configured to protect the first and second connector pins from damage when the container is mounted and detached from the base.

6. The ultrasonic cleaning device as claimed in claim 4, wherein the container is detachably mounted on the base via at least a central connection.

7. The ultrasonic cleaning device as claimed in claim 4, wherein the container and base are connected via a magnetic material.

8. The ultrasonic cleaning device as claimed in claim 4, where in the base is provided with feet for stability.

9. The ultrasonic cleaning device as claimed in claim 4, wherein the base is provided with a groove configured to accommodate a barrier ridge of the container and/or the container is provided with the groove configured to accommodate the barrier ridge of the base, and wherein the groove accommodating the barrier ridge aligns the base and the container.

10. The ultrasonic cleaning device as claimed in claim 9, wherein the base and the container are each provided with a means for alignment, wherein a first means for alignment comprises at least one protrusion and a second means for alignment comprises at least one recess configured to receive the at least one protrusion.

11. The ultrasonic cleaning device as claimed in claim 4, wherein a mounting surface opposing the mounting surface provided with the at least one barrier ridge is provided with at least one groove, the at least one groove being configured to accommodate the at least one barrier ridge such that opposing mounting surfaces of the container and the base are shaped to substantially inter-fit.

12. The ultrasonic cleaning device as claimed in claim 11, wherein the at least one groove and the at least one barrier ridge are circular and wherein the at least one groove accommodating the at least one barrier ridge aligns the container on the base at any angle of orientation relative to the base.

13. The ultrasonic cleaning device as claimed in claim 4, wherein the at least one barrier ridge protrudes from the base, wherein the container comprises at least one groove configured to accommodate the at least one barrier.

14. The ultrasonic cleaning device as claimed in claim 13, wherein the container is aligned on the base when the at least one groove accommodates the at least one barrier ridge.

15. A cleaning method for oral appliances using the device of claim 4, the method comprising: filling the tank of the device with liquid; introducing one or more oral appliances into the tank; mounting the container on the power supply base; driving the ultrasonic transducer via the power supply base; and vibrating the liquid with ultrasonic waves to clean the or each oral appliance.

* * * * *